April 4, 1961

J. A. DUKE 2,977,842

MEASURING METHOD AND APPARATUS

Filed Aug. 6, 1958

INVENTOR.
JOHN A. DUKE

BY *Arthur H. Swanson*

ATTORNEY.

United States Patent Office 2,977,842
Patented Apr. 4, 1961

2,977,842
MEASURING METHOD AND APPARATUS

John A. Duke, Roslyn, Pa., assignor to Minneapolis-Honeywell Regulator Company, Minneapolis, Minn., a corporation of Delaware Filed Aug. 6, 1958, Ser. No. 753,572
6 Claims. (Cl. 88—14)

The present invention relates to an improved method and apparatus for measuring the quantity of moisture in a moving sheet such as, for instance, a moving sheet of paper.

In the manufacture of sheet material such as paper, the strength of the finished product is partially dependent upon the amount of moisture left in the sheet. When the sheet is effectively "dried" so that there is no free moisture left, the sheet has reached maximum strength and the step of drying the paper during manufacture is complete. If the drying of the sheet is discontinued before all free moisture has been driven therefrom, then the product will be defective which may result in great economic loss. On the other hand, if the sheet is dried out too much then the fiber strength and quality of the paper will be considerably reduced.

One object of the present invention is thus to provide an apparatus that will accurately detect the aforementioned moisture content in a sheet such as, for instance, a sheet of paper so that the aforementioned dangers resulting from underdrying and/or overdrying of such a sheet may be avoided.

Another object of the present invention is the provision of a means for measuring the moisture content of a movable sheet, which means is highly reliable, requires little or no maintenance and is relatively inexpensive to build and install.

A further object of this invention is the provision of a new and simple method for measuring the moisture content in a moving sheet.

This application along with my copending United States patent application, Serial No. 753,570 filed by James Vollmer and myself, John A. Duke, and which is assigned to the same assignee, each make use of an apparatus which measures the index of refraction and/or absorption characteristics of a substance surounding a radiant energy guide or rod member. Although this application relies on the aforementioned referred to application of James Vollmer and myself to clearly assert the principles upon which measurements of these substances may be acquired this present application differs from that of the Vollmer et al. application in that it discloses a characterized radiant energy rod arrangement which is particularly adapted to measure the moisture control of a sheet of web material as will be hereinafter described. The Vollmer et al. application on the other hand, discloses a radiant energy guide which is particularly adapted to measure the specific gravity and/or composition of a fluid.

A still more specific object of the invention is thus to provide an apparatus to measure the index of refraction and/or absorption characteristics of moisture which is retained in various portions of a continuously moving sheet of web material in order to determine the extent to which moisture has been removed therefrom by a drier through which this material is required to pass.

Before describing the present invention, the principle of operation will be described. It has been discovered that when light is transmitted through a highly refractive rod such as, for instance, an artificial sapphire rod, the amount of light which will pass all the way through said rod from one end to the other is dependent upon the index of refraction of the surounding medium. With the index of refraction of the rod relatively high such as would be true with an artificial sapphire rod and the index of refraction of the surrounding medium relatively low such as would be true if the surrounding medium were a gas, substantially all of the light entering one end of the rod will pass out of the other end due to the large angle of total reflection resulting from the entire light transmitting system. However, in the event that the surrounding medium has a higher index of refraction such as, for instance, water, then the angle of total reflection is reduced and substantially more light will pass out of the rod under these conditions than under the condition where the index of refraction of the surrounding medium is very small. It is this principle on which the present apparatus operates.

Figure 1:
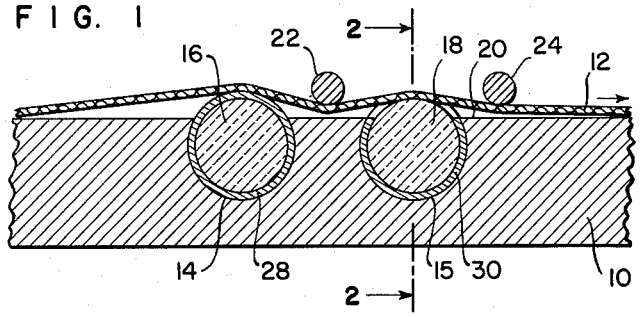
Fig. 1 is a side elevational view of a portion of apparatus along which a sheet travels, said apparatus including a view of the present invention taken through section line 1—1 of Fig. 3.

Referring now to the drawing in detail, the apparatus includes a planar surface or table 10 on which a movable sheet such as paper 12 moves in the direction of the arrow shown in Fig. 1. Mounted in arcuate grooves 14 and 15 in the table 10 are two parallel highly refractive rods 16 and 18, respectively. The rods may be made of any material having a high index of refraction such as, for instance, artificial sapphire, although quartz and highly refractive organic materials may be employed. As shown herein in Figs. 2 and 3, sapphire rods 16 and 18 are longer than table 10 is wide so that their free ends are disposed beyond the edge of the table 10. It is also to be noted that at least rod 18 extends slightly above the upper surface 20 of table 10 so that the sheet 12 in passing over rod 18 is in intimate engagement therewith. To insure this intimate engagement, a pair of pressure rollers 22 and 24, which may be of a well known commercially available type, are disposed on both sides of rod 18. Although not shown, the ends of these pressure rollers may be rotatably mounted on any stationary member such as on the table 10 or any other stationary member.

Figure 2:
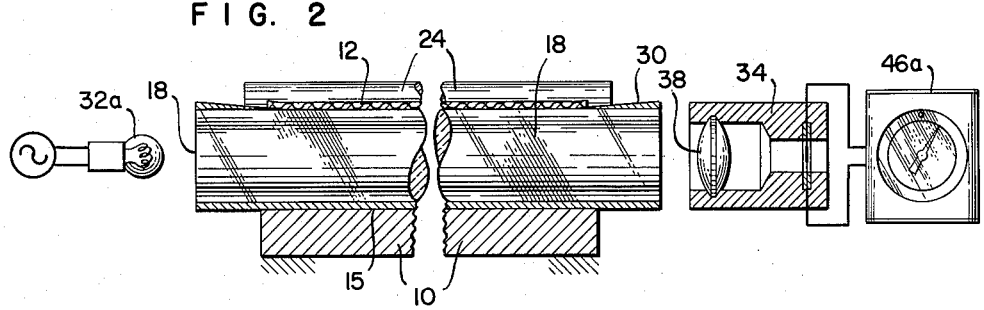
Fig. 2 is a sectional view taken along the line 2—2 of Fig. 1 and shows an arrangement in which a light source of constant intensity is being employed.

Sapphire rod 16 will hereinafter be referred to as the reference rod. Preferably, the outer surface of rod 16 is completely coated with a reflective material 28 such as, for instance, silver, although other reflecting materials may be employed. Rod 18 will hereinafter be referred to as the detecting rod. Rod 18 is also provided with a reflective coating 30 but coating 30 overlies only that portion of rod 18 which does not come into contact with sheet 12 as the sheet moves over table 10. In other words, coating 30 will overlie that portion of the surface of detector rod 18 which is disposed below surface 20 of table 10 and also the ends of rod 18 as shown in Figs. 1 and 2. The remaining portion of the surface of detector rod 18 is uncoated. As was the case with coating 28, coating 30 may be made of any reflective material such as, for instance, silver. The metallic coatings serve to eliminate possible variations in light loss through the rod surfaces due to changes in atmospheric conditions, deposition of foreign matter on the rod surfaces, etc. These variations might change the radiant energy transmitting qualities of the rods and thereby introduce errors in the operation of the apparatus, as will be more fully understood as this description progresses. With the coatings provided, no light can pass out of the rods through the rod surfaces underlying the coatings. The metallic reflective coatings serve to prevent light entering one end of either the reference rod 16 or the detector rod 18 from passing out of said rods through the surfaces underlying the reflective coatings.

Figure 3:
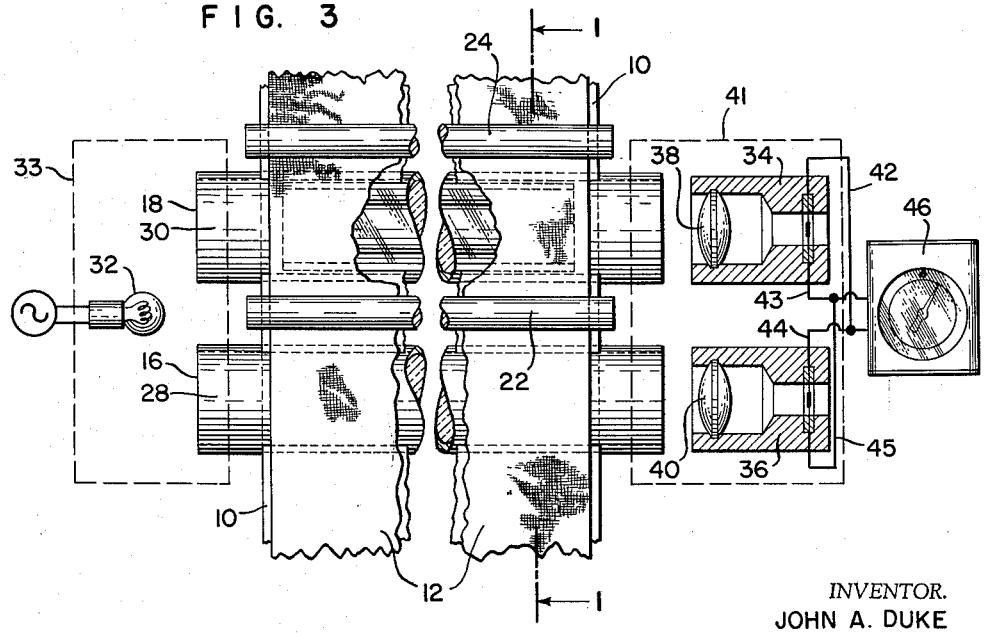
Fig. 3 is a plan view of the apparatus shown in Fig. 1 and shows another arrangement in which a light source that is subject to variations in intensity is employed.

Disposed adjacent one end of rods 16 and 18 is a suitable light source such as, for instance, an incandescent bulb 32. Rods 16 and 18 are closely spaced from one another and bulb 32 is disposed relative thereto to insure that a uniform amount of light enters both rods 16 and 18 as shown in Fig. 3. Fig. 3 also shows an enclosure 33 encompassing the ends of the rods 16, 18 and the light source 32 so that stray light or any foreign matter will be prevented from coming in contact with the unprotected light end surface of the rods 16, 18. Adjacent the opposite ends of rods 16 and 18 are a pair of light detecting means such as, for instance, thermopiles 34 and 36, respectively. Thermopiles 34 and 36 are carefully calibrated so that they will each put out the same electric signal for the same intensity of light passing through their respective lenses 38 and 40. Fig. 3 also shows an enclosure 41 encompassing the right ends of the rods 16, 18 and the thermopiles 34, 36 so as to prevent stray light or any foreign matter from coming in contact with the unprotected end surface of the rod 16, 18. To compare the signals being put out by thermopiles 34 and 36, the output leads 42, 43, 44, 45 of the thermopiles 34 and 36 are connected in opposition and an ammeter 46 or other similar electrical detecting means is connected so as to detect the direction of the flow of current resulting from the opposed signals. Of course, if the output of both thermopiles 34 and 36 are the same, no current will flow through the meter 46.

It will be obvious that with the surface of reference rod 16 completely coated by reflective coating 28, all of the light entering the left hand end of reference rod 16 will pass out of the right hand end of rod 16 to thermopile 34. However, detector rod 18 is not fully coated and the uncoated portion thereof provides a means for light entering the left hand end of detector rod 18 to pass out of said rod. The amount of light passing out of rod 18 will depend on the medium surrounding the uncoated portion hereof. It has been discovered that sheet material such as paper having substantially no free moisture therein will not materially increase the index of refraction and/or absorption characteristics of the medium surrounding the uncoated portion of detector rod 18 over that which would be encountered if air were surrounding said portion. Accordingly, the index of refraction and/or absorption characteristics of the medium which surrounds the uncoated portion of detector rod 18, such as dry paper, will thus be extremely low and there will be substantially no light passing out of detector rod 18. Therefore, the same amount of light entering the left hand end of rod 18 as viewed in Figs. 2 and 3 will pass out of the right hand end of said detector rod and into the lens 40 of thermopile 36. Accordingly, thermopile 36 will put out the same signal as thermopile 34 and the ammeter 46 will remain in its zero position to indicate that the paper sheet 12 is dry. However, in the event that the sheet of paper 12 has a free moisture content, the index of refraction and/or absorption characteristics of the medium surrounding the uncoated portion of detector rod 18 will be substantially greater than the index of refraction surrounding the uncoated portion when a dry sheet overlies said portion. Therefore, a substantial or measurable amount of light will be able to pass out of the rod 18 and into the damp sheet 12. This loss of light will cause a reduction in the output of thermopile 36 and this reduction in output will cause the meter 46 to react and show a flow of current therethrough. The meter action will be proportional to the light loss through the uncoated portion of the surface of detector rod 18 which in turn is dependent on the moisture content of sheet 12. When the meter action goes beyond permissible limits to thus indicate that the sheet 12 is not sufficiently dry, the operator will take necessary steps to correct the situation. For instance, the temperature of the atmosphere for drying the paper may be increased or the rate of movement of the paper over table 10 may be decreased.

Although the apparatus described above embodies one preferred form of the present invention, it will be understood that the use of the reference rod 16 is not necessary with the rod-meter arrangement shown in Fig. 2. A satisfactory measurement may be obtained with this Fig. 2 arrangement by utilizing just the detector rod 18 in combination with a constant light source 32a. When such an embodiment of the present invention is utilized, then the output of the thermopile 36 will be directly measured by any suitable device such as a meter 46. When the paper sheet 12 running over the rod 18 is dry, the output of thermopile 36 as measured by meter 46 will be a given value. However, when the sheet 12 includes free moisture, the amount of light entering the thermopile 36 will be reduced due to the passage of some of the light in detector rod 18 out of said detector rod and into the moist sheet 12. Accordingly, the output of thermopile 36 will drop and this will cause a reaction by meter 42, which reaction will inform an operator that the sheet 12 is too moist. Since the light source 32a is one which is of a constant intensity no erroneous indications at the meter 46a will be introduced as was the case with the arrangement shown in Fig. 3 in which the light source 32 is one which is subject on occasions to variations in intensity. Therefore, the constant light source arrangement shown in Fig. 2 will not require an additional rod such as the rod 18 shown in Fig. 3 arrangement to obviate the aforementioned changes in light intensity.

From the aforementioned description of the apparatus shown in either Figs. 1 and 3 or the apparatus shown in Fig. 2 it is thus evident that each form is useful in measuring the index of refraction and/or the absorption characteristics of a continuously moving sheet of material and that such measurement can be used to indicate when a change in moisture in the sheet occurs.

What is claimed is:

1. Apparatus for measuring the moisture content of a moving sheet, comprising a first sapphire rod having a peripheral surface and two end surfaces, a second sapphire rod substantially identical to said first rod, said first rod being adapted to have only a portion of its peripheral surface in surface-to-surface relation with said sheet, said second rod being out of surface-to-surface relation with said sheet, the portion of the peripheral surface of said first rod adapted to be out of surface-to-surface relation with said sheet being coated with a reflective material, the peripheral surface of said second rod being coated with a reflective material, a light source disposed so as to direct equal amounts of light on one end of each of said first and second rods, and first and second light responsive means disposed adjacent the other end of said first and second rods, respectively, to respond to the light emanating from said other ends of their associated rods.

2. Apparatus for measuring the moisture content of a moving sheet, comprising a first sapphire rod having a peripheral surface and two end surfaces, a second sapphire rod substantially identical to said first rod, said first rod being adapted to have only a portion of its peripheral surface in surface-to-surface relation with said sheet, said second rod being out of surface-to-surface relation with said sheet, the portion of the peripheral surface of said first rod adapted to be out of surface-to-surface relation with said sheet being coated with a reflective material, the peripheral surface of said second rod being coated with a reflective material, a light source disposed so as to direct equal amounts of light on one end of each of said first and second rods, and first and second light responsive means disposed adjacent the other end of said first and second rods, respectively, to respond to the light emanating from said other ends of their associated rods, and means for comparing the responses of said first and second light responsive means.

3. Apparatus for measuring the moisture content of a moving sheet, comprising a substantially planar surface for supporting said sheet, said surface being provided with a pair of grooves extending transversely of the direction of movement of said sheet, first and second sapphire rods disposed in said grooves, each of said rods having a peripheral surface and two end surfaces, said first sapphire rod having a portion of its peripheral surface disposed above said planar surface to adapt said portion to be in surface-to-surface relation with said sheet, substantially all of the remaining portion of the peripheral surface of said first rod and substantially all of the peripheral surface of said second rod being coated with reflective material, a light source disposed so as to direct equal amounts of light on one end of each of said first and second rods, and first and second thermopiles disposed adjacent the other end of said first and second rods, respectively, to respond to the light emanating from said other ends of their associated rods.

4. Apparatus for measuring the moisture content of a moving sheet, comprising a substantially planar surface for supporting said sheet, said surface being provided with a pair of grooves extending transversely of the direction of movement of said sheet, first and second sapphire rods disposed in said grooves, each of said rods having a peripheral surface and two end surfaces, said first sapphire rod having a portion of its peripheral surface disposed above said planar surface to adapt said portion to be in surface-to-surface relation with said sheet, substantially all of the remaining portion of the peripheral surface of said first rod and substantially all of the peripheral surface of said second rod being coated with reflective material, a light source disposed so as to direct equal amounts of light on one end of each of said first and second rods, and first and second thermopiles disposed adjacent the other end of said first and second rods, respectively, to respond to the light emanating from said other ends of their associated rods and means for comparing the outputs of said first and second thermopiles.

5. Apparatus for measuring the moisture content of a moving sheet, comprising a substantially planar surface for supporting said sheet, said surface being provided with a pair of grooves extending transversely of the direction of movement of said sheet, first and second sapphire rods disposed in said grooves, each of said rods having a peripheral surface and two end surfaces, said first sapphire rod having a portion of its peripheral surface disposed above said planar surface to adapt said portion to be in surface-to-surface relation with said sheet, substantially all of the remaining portion of the peripheral surface of said first rod and substantially all of the peripheral surface of said second rod being coated with reflective material, means disposed above said planar surface and adapted to engage said sheet to hold said sheet in surface-to-surface relation with said portion of the peripheral surface of said first rod extending above said planar surface, a light source disposed so as to direct equal amounts of light on one end of each of said first and second rods, and first and second thermopiles disposed adjacent the other end of said first and second rods, respectively, to respond to the light emanating from said other ends of their associated rods.

6. A method of measuring the moisture content of a moving sheet wherein a pair of substantially identical sapphire rods are employed, comprising the steps of placing a portion of the surface of one of said rods in surface-to-surface relation with said sheet while keeping the other of said rods out of surface-to-surface relation with said sheet, directing substantially equal amounts of light at one end of each of said rods, and comparing the amounts of light coming out of the other ends of said rods.

References Cited in the file of this patent

UNITED STATES PATENTS

| | | |
|---|---|---|
| 2,253,356 | Van Der Akker | Aug. 19, 1941 |
| 2,569,127 | Eltenton | Sept. 25, 1951 |
| 2,606,294 | Hagan | Aug. 5, 1952 |
| 2,790,081 | Munday | Apr. 23, 1957 |
| 2,794,924 | Skarstrom | June 4, 1957 |